Figure 1:
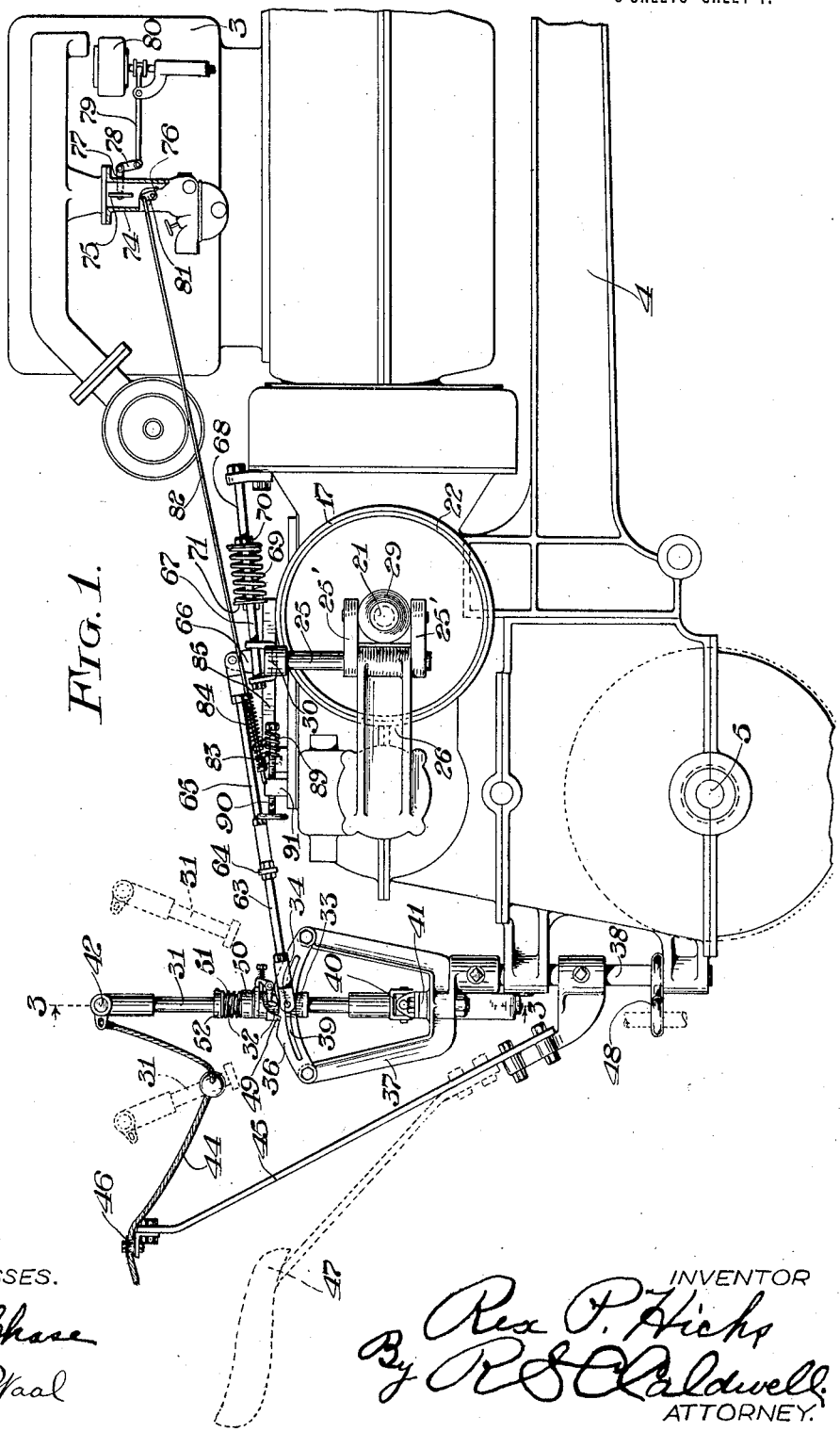

R. P. HICKS.
CONTROL MECHANISM FOR TRACTORS.
APPLICATION FILED MAY 12, 1919.

1,355,336.

Patented Oct. 12, 1920.
3 SHEETS—SHEET 1.

WITNESSES.
H. D. Chase
C. L. Waal

INVENTOR
Rex P. Hicks
By R. S. Caldwell
ATTORNEY.

R. P. HICKS.
CONTROL MECHANISM FOR TRACTORS.
APPLICATION FILED MAY 12, 1919.

1,355,336.

Patented Oct. 12, 1920.
3 SHEETS—SHEET 2.

WITNESSES.
H. P. Chase
C. L. Waal

INVENTOR
Rex P. Hicks
By R. L. Caldwell
ATTORNEY

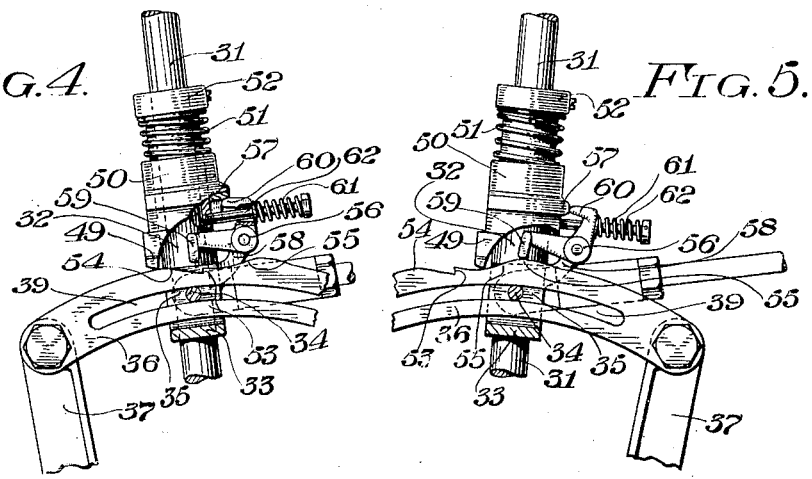
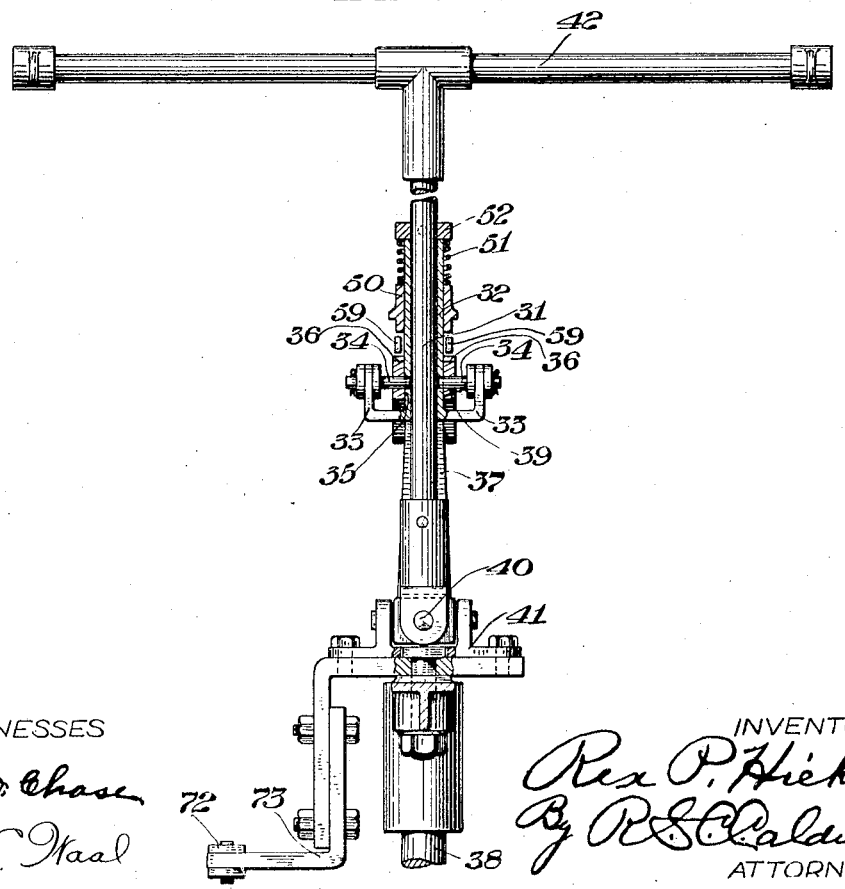

UNITED STATES PATENT OFFICE.

REX P. HICKS, OF MILWAUKEE, WISCONSIN, ASSIGNOR TO HICKS TRACTOR COMPANY, OF MILWAUKEE, WISCONSIN, A CORPORATION OF SOUTH DAKOTA.

CONTROL MECHANISM FOR TRACTORS.

1,355,336.    Specification of Letters Patent.    Patented Oct. 12, 1920.

Application filed May 12, 1919. Serial No. 296,345.

*To all whom it may concern:*

Be it known that I, REX P. HICKS, a citizen of the United States, and resident of Milwaukee, in the county of Milwaukee and State of Wisconsin, have invented new and useful Improvements in Control Mechanism for Tractors, of which the following is a description, reference being had to the accompanying drawings, which are a part of this specification.

The invention relates to control mechanism for motor driven vehicles and more particularly for tractors.

One of the objects of this invention is to provide a control in which the forward and backward movement and stopping and steering of the tractor is accomplished by the movements of a control member in the desired direction, either directly by hand or by a pair of lines or reins, the line control permitting the operator to ride on the implement or wagon which is being drawn or hauled by the tractor, and to control the tractor from his position on the implement or wagon.

A further object of the invention is to provide a line controlled tractor control mechanism in which the actuation of the lines, similar to that of driving a horse, serves to actuate the control mechanism so that the tractor may be either driven forward or backward, turned to the right or the left, or stopped.

A further object of the invention is to provide an automatic speed control for the engine which keeps the speed of the engine low while the tractor is at rest and increases the speed when the tractor is moving.

A further object of the invention is to provide a new and improved form of throttle governing mechanism for the engine under the control of the control mechanism.

The invention further consists in the several features hereinafter set forth and more particularly defined by claims at the conclusion hereof.

Figure 2:
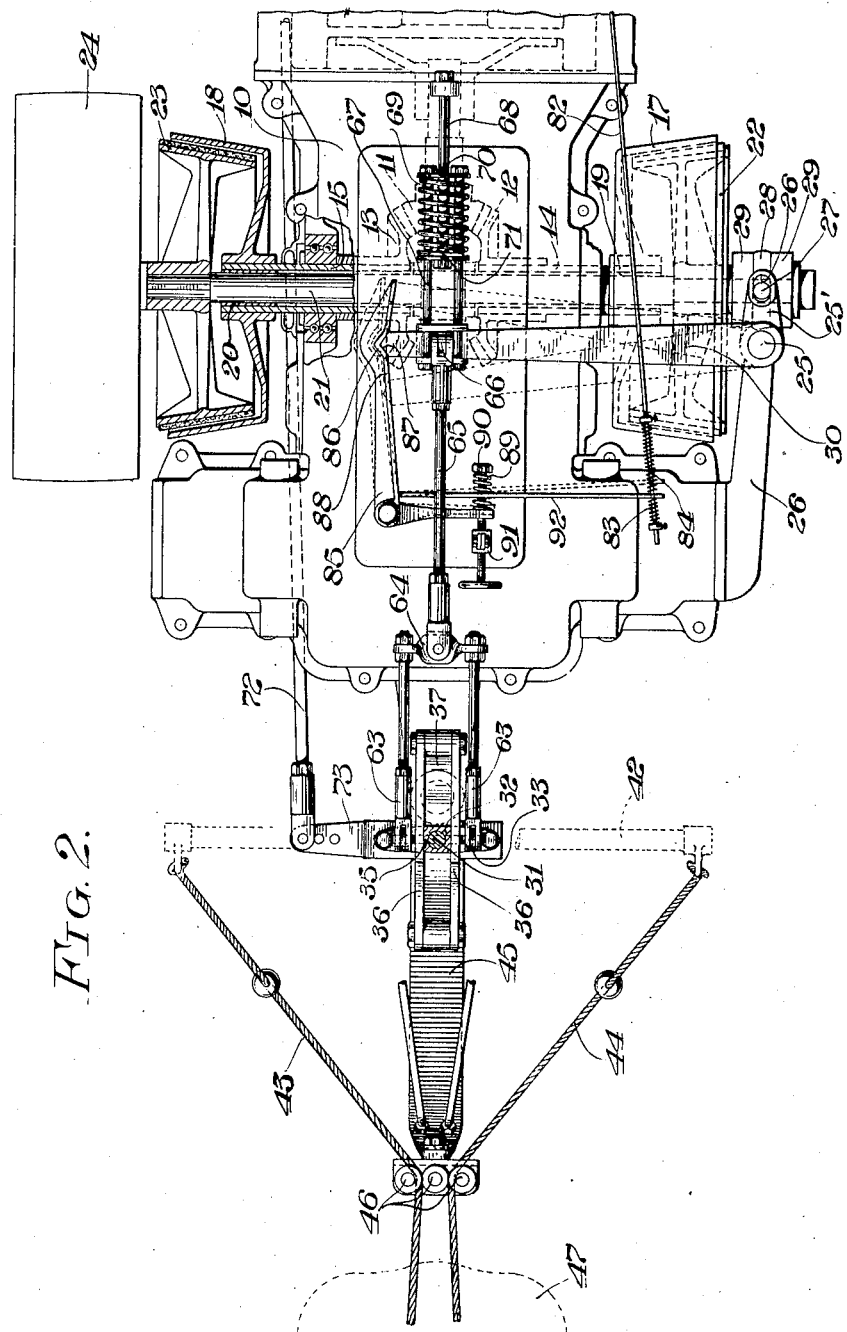

In the drawings:

Figure 1 is a side elevation of the device embodying the invention; Fig. 2 is a plan view thereof, parts being broken away and parts being shown in section; Fig. 3 is a section taken on the line 3—3 of Fig. 1; Figs. 4 and 5 show different operative positions of portions of the control mechanism.

In connection with the control mechanism constituting the invention I have shown a portion of the tractor consisting of the engine 3 mounted on the frame 4 which carries a rear axle drive shaft 5, said drive shaft being connected to an endless tread, which is more particularly shown in my pending application, Serial No. 296,343, filed May 12, 1919, and the transmission mechanism from the engine shaft to the shaft 5 is more particularly shown and described in my copending application Serial No. 296,341, filed May 12, 1919. It will be understood, however, that the control mechanism may be used in connection with other types of tractors, such as the wheel-propelled type, and may be used with other types of transmission mechanism than that just referred to.

By way of illustrating the operation of the control mechanism I have shown in Figs. 1 and 2 a portion of the transmission mechanism shown and described in the aforementioned application, Serial No. 296,341, particularly that portion which shows the reversing feature to permit forward or backward movement of the tractor or to stop its movement, though it will be understood that the control mechanism is not to be limited to this specific form of reversing mechanism.

Referring to Fig. 2, a beveled gear 11 is connected up to the shaft of the engine 3 and meshes with beveled gears 12 and 13 respectively, secured to hollow shafts 14 and 15, suitably journaled in the casing 10. The engine preferably drives its shaft always in the same direction. The shaft 14 carries a friction cone clutch member 17 and the shaft 15 a similar cone clutch member 18. The shafts 14 and 15 have bushings 19 and 20 therein in which a reversing shaft 21 is journaled. The shaft 21 carries a cone member 22 at one end and a similar cone member 23 near the other end with a drive pulley 24 at this end for auxiliary power purposes. The cones 22 and 23 respectively coöperate with the cone members 17 and 18 to drivingly connect either the shaft 14 with the shaft 21 or the shaft 15 with the shaft 21 so as to drive said shaft 21 in opposite directions, and this reversing shaft is connected by suitable gearing with the propelling mechanism of the vehicle, as will more fully appear in the aforementioned application Serial No. 296,343. The shaft 21 may be shifted to actuate the friction clutches above described by any suitable means such as a shaft 25 mounted on a bracket 26 secured to the casing 10 and carrying arms 25' having slotted ends 26 receiving pins 27 mounted on a collar 28, which is loosely mounted on the shaft 21 between the bearings 29. The shaft 25 carries a reversing lever arm 30 and the line control mechanism operates upon this lever to either maintain both of the clutches out or to shift the shaft 21 to throw in either one of the clutches so that a driving connection may be established between the engine and the propelling mechanism to move the tractor in the desired direction.

In these specifications it will be assumed, for the purpose of explanation, that when the cone 23 is in engagement with the cone 18 the tractor will be driven forwardly and that when the cone 22 is in engagement with the cone 17 the tractor will be driven backwardly.

The control member consists of a shaft 31 journaled in a bearing member 32 so that it may move in and with said member 32. The member 32 has upwardly projecting arms 33 which carry inwardly extending pins 34 and has flat sides 35 which slidably engage arcuate locking plates 36 carried by a bracket member 37, mounted on a shaft 38 secured to the frame 4 of the machine. The plates 36 have arcuate slots 39 therein in which the pins 34 are free to slide. The shaft 31 is connected at its lower end to the bracket 37 so as to be capable of turning and swinging backwardly and forwardly by means of a universal joint connection designated generally by the numeral 40, one member 41 of this joint being journaled in the bracket 37. The member 31 is provided with a cross bar 42 which forms an operating handle and to the respective ends of which reins 43 and 44 are connected. The reins are supported and guided adjacent to the control shaft by means of an upright 45 secured at its lower end to the shaft 38 carrying guide pulleys 46 between which the reins pass and, if desired, a seat structure 47 may be connected to the upright 45 so that the operator may directly control the movements of the member 31, though preferably the movements of this member are controlled by the reins which are led back to a position where they can be held by the operator riding on the implement or wagon being drawn by the tractor, and to connect up this implement or wagon a member 48 is secured to the shaft 38 and adapted to receive a king pin or other attaching device to connect up the implement or wagon.

The shaft 31 and member 32 are normally secured to the plates 36 by means of a spring pressed latch 49 having a tubular sleeve 50 which is slidably mounted upon the tubular upper end of the member 32. A spring 51 surrounding the tubular end of the member 32 is interposed between the tubular portion 50 of the latch and a collar 52 fixed to the shaft 31. The latch 50 rides on the top of the plates 36. These plates have locking notches 53, cam surfaces 54 and cam surfaces 55 on their top edges. The spring 51 normally acts to move the latch 49 into engagement with the plates and when said latch registers with the notch 53 the control means is in normal position. Backward swinging of the control member is not resisted by the latch as it is free to ride on the cam surfaces 54 but said backward swinging is normally prevented by means hereinafter described. To permit forward swinging of the control member, means are provided for holding the latch in raised position so as to permit its passage above the notch 53. This is accomplished by means of a dog 56 coöperating with a cam projection 57 on the latch. The dog 56 is pivotally mounted on an arm 58 of the member 32 and is in the form of a bell crank lever. One arm thereof has its end 59 engageable with the cam surfaces 54 and 55 and the other arm thereof has its end 60 engageable with the cam projection 57 on the latch member. The dog 56 is acted upon by a spring 61 mounted on a rod 62 secured to the upper end of the member 32, said spring serving to move the dog so that the ends of its arms will respectively engage the plates 36 and the latch 49 at the desired times.

The normal position of the control lever is shown in Fig. 1, where the latch 49 engages the notches 53 and the dog 56 is in inoperative position. To shift the control member for forward drive it is first pulled rearwardly a slight distance swinging on its pivot and then swung forwardly, which movements are substantially the same as are used in the manipulation of reins to start a horse. The short rearward movement of the control moves the latch 49 up on the cam surfaces 54 and thereby raises the latch upon the member 32 to such a height as will allow the dog 56 to move inwardly so that its end 60 will be moved beneath the cam projection 57 to hold the latch in inoperative position, the parts being then in substantially the position shown in Fig. 4. With the latch thus held above the notches on the locking plates by the dog, forward swinging or release of the control for forward movement is permitted so that the latch is carried over the notches 53. Thereafter the latch 49 is released by the dog as the ends 59 ride upon the cam surfaces 55, which causes a swinging of the dog 56 to move the end 60 out of engagement with the cam projection 57 against the action of the spring 62. When the dog is so moved the latch 49 is urged by the spring 51 down into engagement with the locking plates 36 but beyond the notches 53, the parts being then in the position shown in Fig. 5. This action sets the latch member for locking in normal position if desired, as the rearward movement of the control necessarily results in the latch 49 dropping down behind the notch 53. Backswinging of the control member, either from the forward position or from the normal position is freely allowed by the locking plates and the dog 56 and such backswinging produced by a rearward pull on the reins is similar to the action of a man pulling on the reins to back up a horse, while the slight pull on the reins required to swing the control member from forward to neutral position is similar to the pull on the reins used to stop a horse.

The control is connected up to the reversing shaft and more particularly to the lever arm 30 by a link connection consisting of rods 63 secured to the ends of an equalizer 64, which is medially pivotally connected to one end of a link 65, the other end of said link being pivotally connected to a part 66 of the lever 30. The control member is maintained in normal neutral position by spring means which exert a forward pull upon the control to hold the latch in engagement with the notches 53 and this spring means consists of rods 67 secured to the lever 30 and a rod 68 secured to a fixed portion of the machine with a spring 69 interposed between plates 70 and 71 slidably mounted respectively upon the rod 68 and the rods 67, whereby the spring 69 will exert a constant force against the rods 67 to swing the lever 30 toward the right and consequently exert a constant force tending to swing the control member forwardly which is normally resisted by the latch 49 when in locking engagement with the notches 53 but which is readily permitted when such latch is released as previously described. When the movement of the control member to forward position occurs the spring 69 moves the lever 30 toward the right, and this motion transmitted through the shaft 25, arms 25′, pin 27, and collar 28, shifts the shaft 21 to bring the clutches 18 and 23 into engagement with each other, which under the conditions assumed would accomplish forward drive of the tractor. When the lever 30 is in the position shown in Fig. 2 at which time the control member is in neutral position, both of the clutches of the shaft 21 are out and the vehicle is at rest. For backward drive the pull of the control member beyond neutral swings the lever 30 toward the left, the pull being against the action of the spring 69 and this motion, through the connections previously described, shifts cone 22 into engagement with the cone 17 so as to drive the shaft 21 in the direction to produce rearward movement of the tractor and as soon as the pull on the reins is released the spring 69 moves the control to bring it to neutral position, also the lever 30 to move the shaft 21 to neutral position. Thus a short pull back and a forward movement of the reins starts the machine for forward drive and a partial rearward pull on the reins stops the machine and a full rearward pull on the reins backs the machine.

The steering is accomplished by securing a connecting rod 72 to the crank end of the member 41, which has previously been described as being a part of the control member, and one of the parts of the universal joint, and consequently when the shaft 31 is turned by means of the cross bar 42, either by hand or by the reins, the member 41 will turn with it and move the connecting rod 72 so as to actuate the steering mechanism to turn or cause turning of the tractor in the desired direction, and, as designed, a pull on the right rein actuates the steering mechanism to turn the tractor to the right and a pull on the left rein produces a turning to the left and the universal joint 40 permits turning of the member 41 when the control is swinging rearwardly or forwardly. The connecting rod 72 may be connected up with any suitable steering mechanism and one such mechanism is shown and described in my application filed May 12, 1919, Serial No. 296,342. The control member forms part of the steering post of the tractor.

The engine 3 is provided with an intake manifold 74 having a butterfly throttle valve 75 therein and a butterfly throttle valve 76 also located in the manifold below the valve 75. The valve 75 is provided with a crank 77 connected by a link 78 with the oscillating lever 79 of the governor 80, which may be of any suitable construction and which is set so that the control 75 will be held in a predetermined position when the engine reaches the desired speed. The valve 76 is provided with a crank 81 secured to a connecting rod 82 carrying springs 83 and 84. A bell crank lever 85 is pivotally mounted upon the frame of the transmission mechanism and one of its arms is provided with a notch 86 engageable with the beveled end 87 of the arm 30 and the sides 88 of said arm adjacent to said notch are slightly inclined in opposite directions from the notch. The lever 85 is yieldingly maintained in engagement with the lever 30 by means of a spring 89 bearing upon the other arm of the lever 85 and capable of adjustment by the adjustment of a threaded rod 90 upon which it is mounted, said rod being carried by a bracket 91. The spring 89 serves to swing the lever 85 so as to bring the inner side of the notched arm into constant bearing engagement with the beveled end 87 of the lever 30. Consequently when the lever 30 is swung either to the right or the left the notched arm will move outwardly and this outward movement of the arm is imparted to the throttle 76 through a connection between the lever 85 and the rod 82. This connection consists of a rod 92 secured at one end to the notched arm and at its other mounted on the rod 82 between the springs 83 and 84.

When the beveled end 87 of the arm 30 is in engagement with the notched portion 86 of the lever 85, said lever and its associated member 92 are held against movement and the springs 83 and 84 act upon the rod 82 to hold the throttle 76 partly open so that in starting the motor it will operate at low speed and so that said throttle will at starting control the action of the governor throttle. As soon, however, as the lever 30 is shifted either to the right or the left by the movement of the control member for forward or backward drive, as previously described, the lever 85 will be shifted outwardly, thereby causing the associated part 92 to swing toward the right against the action of the spring 84 and open the throttle 76 to a starting position, that is, this movement opens the throttle 76 wide, so that the governor will be brought directly into operation to cause it to regulate the speed of the engine by control of the throttle 75.

With this type of control mechanism all that the operator has to do is to start the engine and as soon as he pulls on the lines for forward or backward drive the engine will be governed by the throttle 75 and will be kept running at constant speed adjusted to best suit the requirements of the work to be done by the tractor, and by means of this automatic throttle control the operator is relieved of the necessity for separate attention to the motor and all that he has to do is to swing the control member backwardly or forwardly or to neutral position so as to propel the tractor in the desired direction or stop it, or to turn the control for turning the tractor to the right or the left whether the tractor is moving forwardly or rearwardly.

It is to be understood that this invention is not limited to any specific form or arrangement of parts except in so far as such limitations are specified in the claims.

What I claim as new and desire to secure by Letters Patent is:

1. In a motor driven vehicle, the combination, with a reverse drive mechanism, of a single swinging and rotating control, means normally maintaining said control in "stop" position, means connecting said control with said mechanism to actuate it on the swinging of said control to either side of its stop position, means automatically releasing said control from "stop" position on the swinging of the control, and steering mechanism operatively connected to said control and controlled by the turning of the control.

2. In a motor driven vehicle, the combination, with a reverse drive mechanism, of line controlled means operatively connected thereto, means normally maintaining said line controlled means in stop position, said line controlled means causing "forward" drive of the vehicle when the reins are given a short back pull from stop position followed by a forward release, said line controlled means producing a "backward" drive of the vehicle on a backward pull of the reins beyond stop position, steering mechanism distinct from said drive mechanism, means operatively connecting said line controlled means with said steering mechanism whereby a pull on either rein will operate said steering mechanism to turn the vehicle in the direction of pull.

3. In a motor driven vehicle, the combination, with the engine and a throttling governor control, of a second throttle control independent of the first named control for rendering the first control inoperative when the vehicle is at rest, and means automatically rendering said second throttle control inoperative when the vehicle is in motion.

4. In a motor driven vehicle, the combination, with the engine and a throttling governor control, of driving mechanism control means for said driving mechanism, a second throttle independent of the first named control for rendering the first control inoperative when the vehicle is at rest, and means operatively connecting said control means with said second throttle to render said second throttle inoperative when the driving mechanism is in operation.

5. In a motor driven vehicle, the combination, with the engine, of means for maintaining the speed of the engine low at starting and while the vehicle is at rest, and means distinct from and independent of said first named means for automatically governing the speed of the engine when the vehicle is in motion.

6. In a motor driven vehicle, the combination, with the driving mechanism thereof, of a swinging control member operatively connected thereto, latching means including a sleeve slidably mounted on said member for locking said control in stop position, and means automatically releasing said latching means on the movement of said control member.

7. In a motor driven vehicle, the combination, with the driving mechanism thereof, of a swinging control member operatively connected thereto, latching means for locking said control in neutral position, a dog for releasing said latching means, and cam means for operating said dog on the swinging of the control member.

8. In a motor driven vehicle, the combination, with a drive shaft, a driven shaft and reversing mechanism connecting said shafts including a reversing lever, of control means including a swinging control shaft, and linkage directly connecting said control shaft with said reversing lever.

9. In a motor driven vehicle, the combination, with the engine, a throttling governor control, and reversing mechanism including a lever, of a second throttle control, and means connecting said second throttle control to said lever to render said second throttle control inoperative when said lever is moved to operative position.

10. In a motor driven vehicle the combination, with the engine and its shaft, a driven shaft and reversing mechanism connecting said shafts including a reversing lever, of a governor controlled throttle, a second throttle operatively connected to said reversing lever, and a control operatively connected to said reversing lever.

11. In a motor driven vehicle, the combination with the driving mechanism thereof, of a swinging control member operatively connected thereto, latching means for positively locking said control in neutral position, a dog for releasing said latching means, and means operable on the swinging of the control for positively actuating said dog.

12. In a motor driven vehicle, the combination, with the driving mechanism thereof, of a swinging control member operatively connected thereto, latching means for positively locking said control in neutral position, tripping means movable with said control for releasing said latching means, and cam means for actuating said tripping means on the swinging of the control member.

13. In a motor driven vehicle, the combination, with the driving mechanism thereof, of a swinging control member operatively connected thereto, a lock plate, a latch slidable upon said member into engagement with said plate, a dog movable with the control member for releasing said latch, and means operable on the swinging of the control for actuating said dog.

14. In a motor driven vehicle, the combination, with the driving mechanism thereof, of a swinging control member operatively connected thereto, a lock plate, a latch slidable upon said member into engagement with said plate, a dog carried by the control for releasing the latch, and cam means for operating said dog on the swinging of the control.

15. In a motor driven vehicle, the combination, with a drive shaft, a driven shaft and reversing mechanism connecting said shafts including clutches and a reversing lever controlling said clutches, of a swinging control, a link directly connecting said control with said reversing lever, means normally maintaining said control in "stop" position, means for releasing said control from "stop" position to permit it to move forwardly to cause actuation of the clutch producing "forward" drive, the rearward swinging of the control causing actuation of the clutch producing "backward" drive.

16. In a motor driven vehicle, the combination, with the driving and steering mechanism thereof, of a swinging and rotating control provided with a universal joint, means operatively connecting the portion of the control above the joint to the driving means which is controlled thereby on the swinging of this portion, means normally holding the control in "stop" position, means operating automatically on the swinging of the control to release said holding means for movement of the control to "forward" or "reverse" position, and means operatively connecting the portion of the control below the joint to the steering mechanism which is controlled thereby on the turning of the control.

17. In a motor driven vehicle, the combination, with the driving mechanism thereof, of a swinging control member operatively connected thereto, a latch plate, a latch engageable with said plate and having a bore in which a portion of said member is slidably and rotatably supported, a dog carried by said member and engageable with the latch to release it from locking engagement with said latch plate, and a cam on said plate engageable with the dog to actuate said dog on the swinging of the control member.

18. In a motor driven vehicle the combination, with the driving mechanism thereof, of a swinging control member operatively connected thereto, latching means for positively locking said control in neutral position, a movable member independent of said latching means for releasing said means, and means operable on the swinging of the control for positively actuating said member.

In testimony whereof I affix my signature, in presence of two witnesses.

REX P. HICKS.

Witnesses:
R. S. C. CALDWELL,
H. D. CHASE.